United States Patent
Aldrich et al.

[11] 3,869,195
[45] Mar. 4, 1975

[54] LIQUID CRYSTAL DISPLAY CONTAINING SEGMENTED SOURCE OF BACK-LIGHTING

[75] Inventors: Ralph E. Aldrich, Acton; Julius Feinleib, Cambridge; Lawrence E. Schmutz, Arlington, all of Mass.

[73] Assignee: Itek Corporation, Lexington, Mass.

[22] Filed: July 2, 1973

[21] Appl. No.: 375,980

[52] U.S. Cl. .......................................... 350/160 LC
[51] Int. Cl. .................................................. G02f 1/16
[58] Field of Search ............................... 350/160 LC

[56] References Cited
UNITED STATES PATENTS

| | | | |
|---|---|---|---|
| 3,668,861 | 6/1972 | Mitsui ...................... | 350/160 LC X |
| 3,700,306 | 10/1972 | Cartmell et al. ..................... | 350/150 |
| 3,736,047 | 5/1973 | Selber et al. ................... | 350/160 LC |
| 3,748,018 | 7/1973 | Borden ......................... | 350/160 LC |

*Primary Examiner*—Edward S. Bauer
*Attorney, Agent, or Firm*—Homer O. Blair; Robert L. Nathans; David E. Brook

[57] ABSTRACT

A display is disclosed which is formed from the combination of a liquid crystal panel and a segmented source of back-lighting. One suitable source of segmented back-lighting comprises a continuous electroluminescent panel sandwiched between transparent electrodes, at least one of the electrodes being segmented. Segmentation of the electroluminescent panel coincides with segmentation of the liquid crystal panel. The advantage of this display is that it has extremely high brightness and contrast over a wide range of ambient lighting conditions.

12 Claims, 7 Drawing Figures

- ANTI-REFLECTION COATING 2
- TRANSPARENT SUBSTRATE 4
- ANTI-REFLECTION COATING 6
- TRANSPARENT ELECTRODE 8
- LIQUID CRYSTAL 10
- PASSIVATING LAYER 12
- SEGMENTED TRANSPARENT ELECTRODE 14
- DICHROIC REFLECTOR 16
- TRANSPARENT SUBSTRATE 18
- TRANSPARENT ELECTRODE 20
- ELECTROLUMINESCENT LAYER 22
- SEGMENTED ELECTRODE 24

LIQUID CRYSTAL DISPLAY CONTAINING SEGMENTED SOURCE OF BACK-LIGHTING

BACKGROUND OF THE INVENTION

1. Field of the Invention

The invention relates to displays and more particularly to flat panel displays formed from liquid crystal materials.

2. Description of the Prior Art

Recently there has been widespread interest for useful applications for the class of materials which have become known as "liquid crystals." Liquid crystals are known to appear in at least three different mesomorphic forms: the smectic, nematic and cholesteric forms. Generally, liquid crystals exhibit some physical properties typically associated with liquids and simultaneously exhibit other physical properties typically associated with crystalline solids. For example, their viscosities are ordinarily similar to those of liquids whereas their optical characteristics are similar to those of crystalline solids. A unique optical property of certain liquid crystal materials is their capability of dynamically scattering incident light if an electric field is applied thereacross. This capability provides many interesting applications for these liquid crystals.

One application for liquid crystal materials is in the field of displays. Liquid crystal materials have outstanding properties for this application. Thus, they can be constructed in flat panels, require only low power to activate, have relatively simple construction, are economical, and can produce high quality displays of information having a variety of intensity and color contrasts.

A serious problem with conventional liquid crystal displays is their poor readability in low ambient light conditions. One method of overcoming this problem is to illuminate the front of the display with an external light source, but such front-lighting techniques result in much larger overall display areas since the light source has to be placed outside the periphery of the display.

Back-lighting can be used without increasing the area of the display. Even with back-lighting, however, it is necessary to minimize light emission in non-activated areas of a display to provide high intensity contrast. Because of this, severe constraints are imposed upon such parameters as viewing angle, background materials, back-lighting direction means, etc.

SUMMARY OF THE INVENTION

In one embodiment, the invention relates to a flat display formed from a liquid crystal panel and including therein a segmented source of back-lighting. One suitable source of segmented back-lighting is an electroluminescent layer wherein one transparent electrode applied to the electroluminescent material is segmented to coincide with the segmentation of the liquid crystal panel. Thus, any combination of predetermined selected discrete locations of the liquid crystal panel and electroluminescent panel can be activated coincidentally.

The advantage of including a segmented source of back-lighting is that some of the other constraints required to produce good display contrast can be relaxed. For example, the light directing layer often required with other displays may be eliminated thereby improving the viewing angle of the display. This is because light is only emitted from the back-lighting source in spatially discrete areas. Additionally, there is no problem with light leakage as sometimes occurs with prior art continuous back-lighting sources.

Because of this, a display is produced which can be read easily by an observer under all ambient conditions, including dim ambient conditions where light leakage and low brightness caused a severe problem in the past.

DESCRIPTION OF PREFERRED EMBODIMENTS

Figure 1:
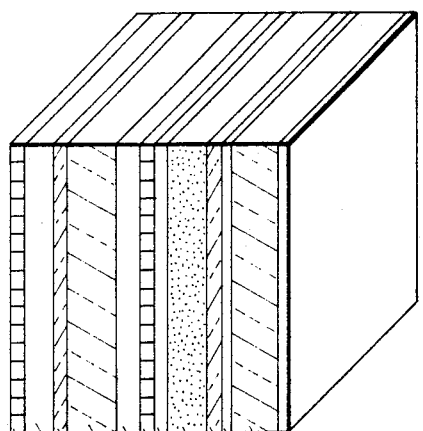
FIG. 1 illustrates schematically a liquid crystal display having a segmented source of back-lighting as described herein.
Figure 1:
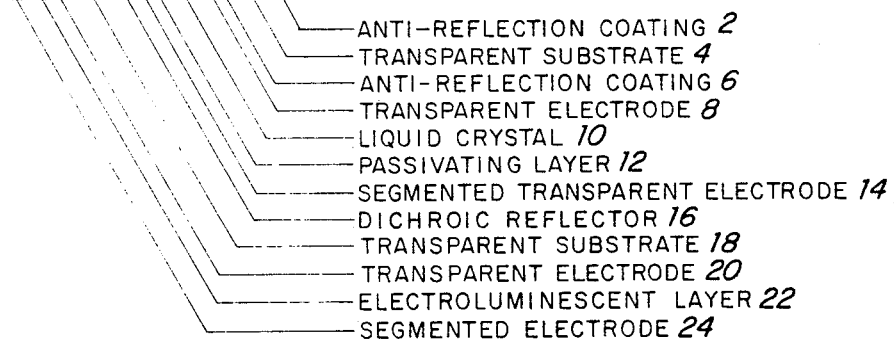

Referring now to the Figures in more detail, FIG. 1 illustrates in schematic form a liquid crystal panel display of this invention which incorporates a segmented electroluminescent source of back-lighting. Anti-reflection coatings 2 and 6 are placed on either side of transparent substrate 4, which can be glass or other transparent, non-conductive materials. Anti-reflection coating 2 minimizes reflections from the front surface of the device, whereas anti-reflection coating 6 minimizes reflections at the interface between transparent substrate 4 and transparent electrode 8. Such anti-reflection coatings are optional, but do improve the operating efficiency of these displays. Transparent electrode 8 is shown as a continuous electrode, but could, of course, be segmented. Suitable transparent electrodes can be formed from layers of conductive transparent materials such as thin evporated layers of indium oxide, tin oxide, etc. Segmentation of such electrodes can be accomplished by depositing the electrode patterns through a mask or by photofabrication techniques which are well known to those skilled in the art.

A layer of liquid crystal material 10 is placed between transparent electrode 8 and passivating layer 12. Liquid crystal 10 can be, for example, any of the well known nematic dynamic scattering materials such as p-methoxybenzylidene-p'-n-butylanine. Passivating layer 12, which can be silicon dioxide, for example, is used to lessen electrochemical reactions in the liquid crystal cell and to provide uniformity of operation. Alternatively, a passivating layer can be placed between electrode 8 and liquid crystal 10. In fact, it is even possible to use light filter 16, e.g., a dichroic reflector, as a passivating layer in which case dichroic reflector 16 is preferably positioned between liquid crystal 10 and electrode 14, or electrode 14 and passivating layer 12 may be included as layers of dichroic reflector 16. Dichroic reflector 16 is fabricated according to well known techniques. See Mil-Handbook-141, Military Standardization Handbook, Optical Design, Section 20— Application of Thin Film Coatings, pp. 20–39 et seq.

The remaining layers in the display include transparent substrate 18, transparent electrode 20, electroluminescent layer 22 and segmented electrode 24. Of course, electrode 20 could be segmented instead of or in addition to electrode 24.

Substrate 18 is similar or identical to substrate 2. Dichroic reflector 16 is chosen to pass wavelengths generated by the electroluminescent panel but to reflect all other wavelengths. Typically, the electroluminescent panel might generate green light, and in this case the dichroic is designed to transmit green light but to reflect both blue and red light.

Electroluminescent layer 22 may comprise a powdered or film material. Typical electroluminescent materials are known to those skilled in the art, and include such materials as zinc sulfide doped with copper (green emitting) and zinc sulfide dope with manganese (orange emitting).

An optional material in displays such as illustrated in FIG. 1 is a light control film which serves to pass light incident within a predetermined range of angles. Typically, light control film contain black louvers positioned in a parallel relationship at any angle desired in a transparent or colored matrix. One suitable light control film for this purpose is sold as "Polychroic Light Control Film" by 3M Co. See Electronic Design News, pp. 15–16, July 1, 1973; and, 3M Co. brochure on Light Control Film. The light control film could be used advantageously with the display described herein if the segmented source of back-lighting were an incandescent lighting matrix or a matrix of light emitting diodes, and if a sufficiently dark background cannot be obtained from the background of the light sources themselves.

Figure 2:
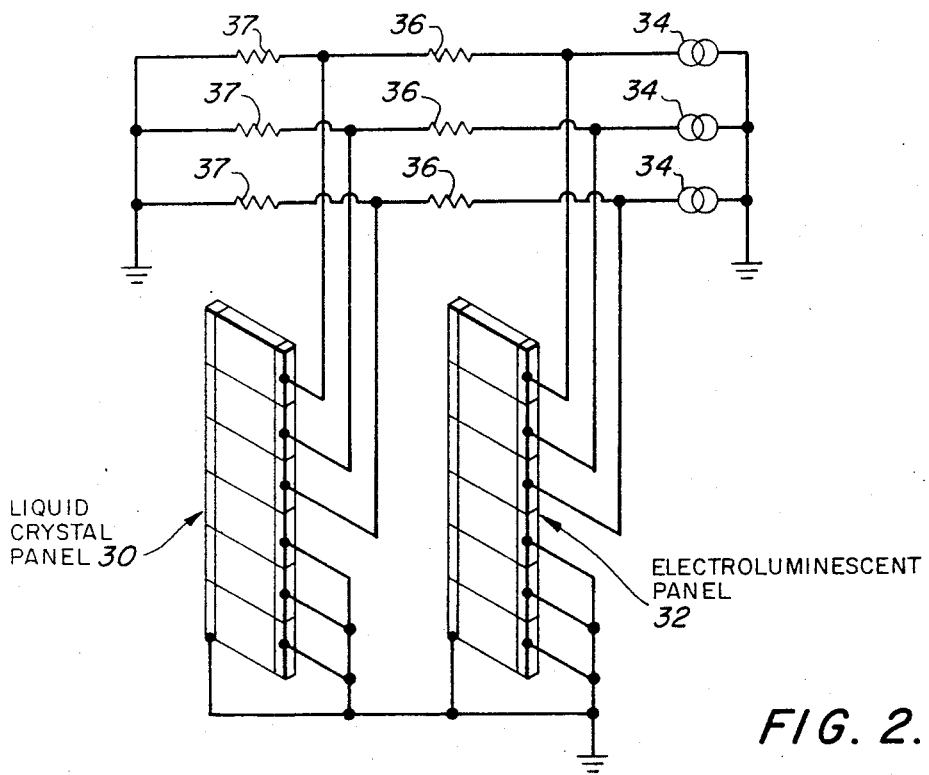
FIG. 2 illustrates schematically an arrangement for activating coincident discrete locations of a liquid crystal panel and an electroluminescent panel.

FIG. 2 illustrates schematically the activation of coincident discrete locations in a liquid crystal panel and an electroluminescent panel suitable as a segmented source of back-lighting. As can be seen, the three upper discrete areas of liquid crystal panel 30 and electroluminescent panel 32 are activated regions. Other regions of both are non-activated areas. The panels have each of their discrete locations wired in parallel to an ac voltage source 34. Resistors 36 and 37, forming a voltage divider, are inserted in the electric circuit of the liquid crystal panel 30 since less voltage is required to activate each liquid crystal element than is required to activate each electroluminescent element. A typical voltage for activating a liquid crystal material is about 25 volts at 100 Hz whereas a typical voltage for activating an electroluminescent panel is about 125 volts at 100 Hz.

Figure 3:
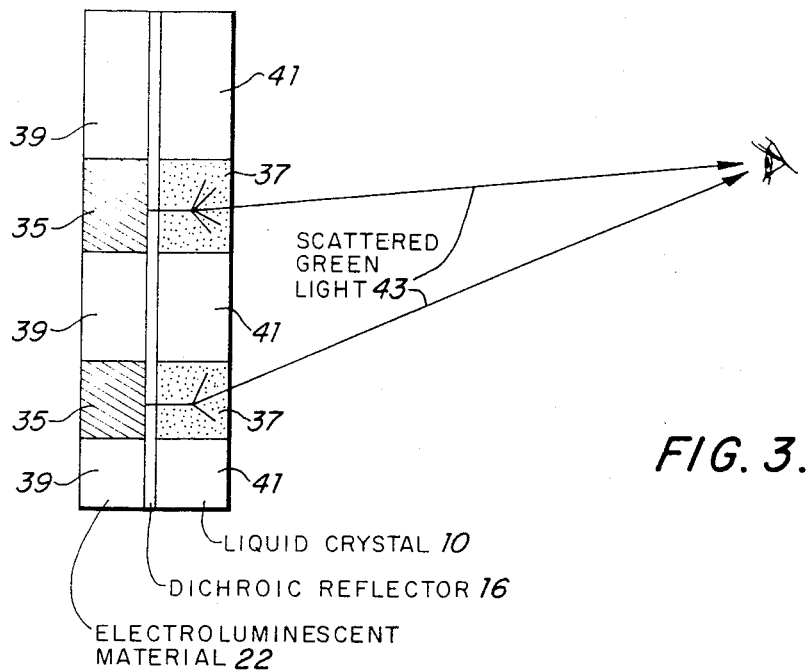
FIG. 3 illustrates in schematic fashion the operation of a display as described herein under low ambient lighting conditions.

FIG. 3 illustrates the operation of a liquid crystal display as described herein under low ambient conditions. To simplify the explanation, the diagram includes only a liquid crystal material 10, dichroic reflector 16 which is assumed to pass green light and reflect other wavelengths, and green-emitting electroluminescent material 22. Activated electroluminescent areas 35 coincide with activated liquid crystal areas 37 and non-activated electroluminescent areas 37 coincide with non-activated liquid crystal areas 41.

In non-activated areas 39 of the display, electroluminescent material 22 does not emit any light since the electroluminescent panel is segmented as described above. Therefore, the observer sees a dark background.

In activated areas 35 of the display, electroluminescent material 22 emits green light which passes through dichroic reflector 16 to activated areas 37 of liquid crystal material 10. This green light is scattered at areas 37 and a portion of the scattered green light 43 reaches the observer. Therefore, in activated regions of the display, the observer sees green.

The net effect under low ambient lighting conditions, therefore, is that the observer sees green light at activated regions of the display whereas the observer sees a dark background in non-activated regions of the display.

Figure 4:
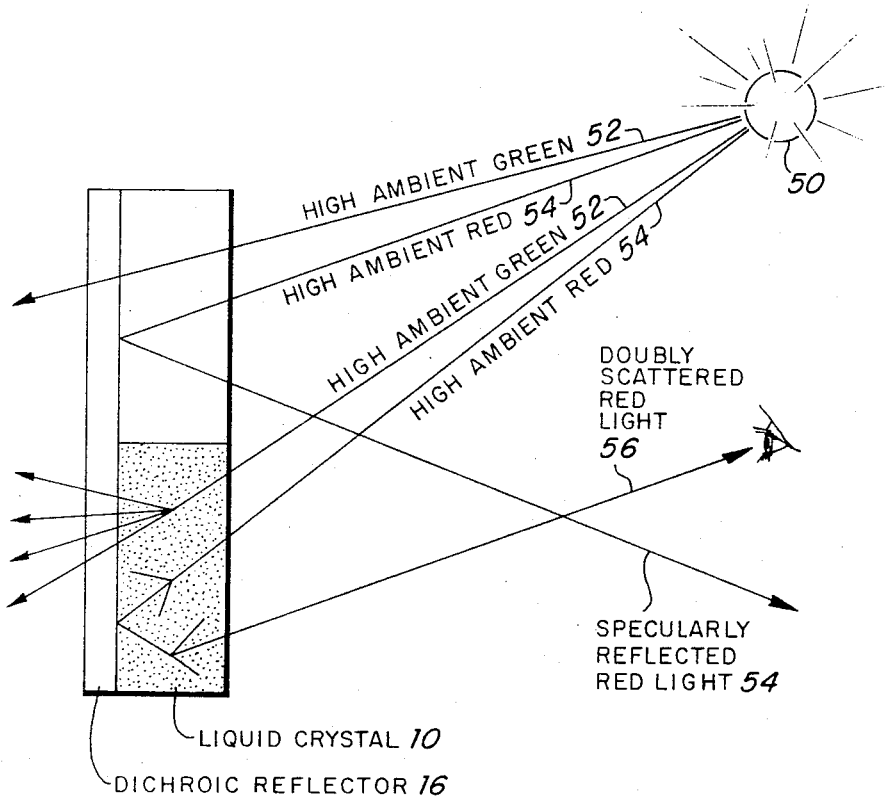
FIG. 4 illustrates schematically the operation of a combination display as described herein under high ambient lighting conditions.

FIG. 4 illustrates schematically the operation of a liquid crystal panel display as described herein under conditions of high ambient light. For purposes of simplification, the display is shown as only including a liquid crystal material 10 and a dichroic reflector 16, since these are the elements contributing to a readable information display under conditions of high ambient. Further, it is assumed for purposes of simplification that the source 50 of high ambient lighting emits only green and red wavelengths, and that dichroic reflector 16 transmits green light but reflects red light. It is also assumed that the liquid crystal material 10 is activated in its lower portion and non-activated in its upper portion.

In non-activated areas of the display, high ambient green light 52 passes through liquid crystal 10 and through dichroic reflector 16 where it is eventually absorbed by some other layer not shown. High ambient red light 54 passes through liquid crystal 10 and is specularly reflected away from the eye of the observer.

In activated portions of the display, high ambient green light 52 is scattered by liquid crystal 10 and passes through dichroic reflector 16 where it is eventually absorbed. High ambient red light 54 striking activated portions of the display is scattered by liquid crystal 10 to dichroic reflector 16. This scattered red light is reflected back to liquid crystal 10, forward scattered once again, and a portion of this doubly scattered red light 56 reaches the eye of the observer.

Thus, under high ambient conditions, the observer sees red light in activated portions of the display and a dark background in non-activated areas of the display.

Figure 5:
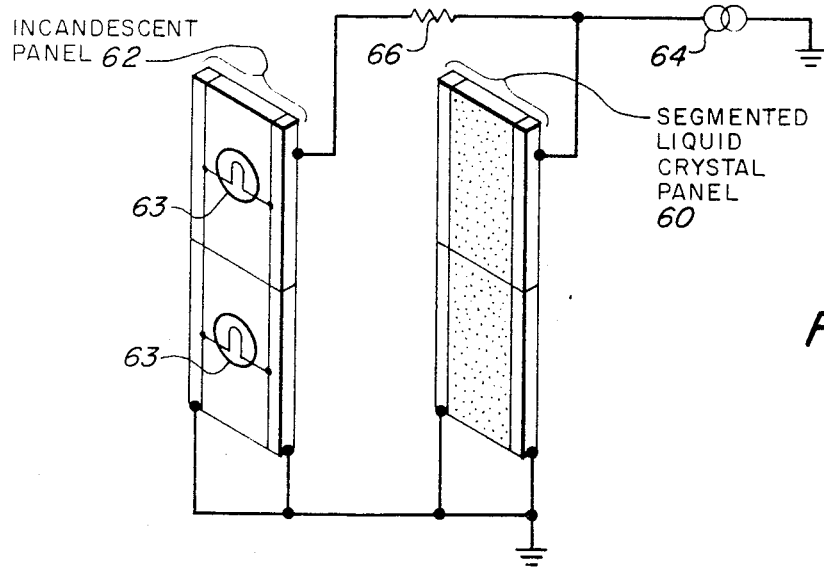
FIG. 5 illustrates schematically a suitable arrangement for activating coincident locations of a liquid crystal panel and an incandescent segmented source of back-lighting for a combination display as described herein.

FIG. 5 illustrates schematically a combined display formed from a liquid crystal panel and a source of incandescent lighting together with a combination driving circuit for both. This is an attractive embodiment since miniature incandescent lamps are available which have the identical or nearly identical voltage drive requirements as the liquid crystal panel. In addition, incandescent panels formed by photofabrication techniques have recently been developed which can provide an array of incandescent filament on a single flat panel. See *Electro-Optical Systems Design*, page 5, February, 1973.

The display illustrated consists of a segmented liquid crystal panel 60 and an incandescent panel 62 containing an array of incandescent filaments 63 arranged in a matching, coincident relationship to the discrete areas of liquid crystal panel 60. For purposes of simplifying the illustration, each panel is shown as being segmented into an upper and a lower portion, and the upper portion of each is activated whereas the lower portion of each is non-activated.

Voltage source 64 provides a suitable driving voltage, such as 25 volts at 60 Hz. Resistor 66 is optional, and may be used if desirable to limit the current through the incandescent filaments 63. Activated incandescent filaments serve the same function as activated segments of the electroluminescent panels described above. Because incandescent lamps emit broadband radiation, dichroic reflectors described above may have characteristics other than those required for efficient operation of the electroluminescent panel. For example, a dichroic reflector could be used which transmitted red light but reflected green light to provide maximum readability of the display illuminated by incandescent lamps.

Figure 6:
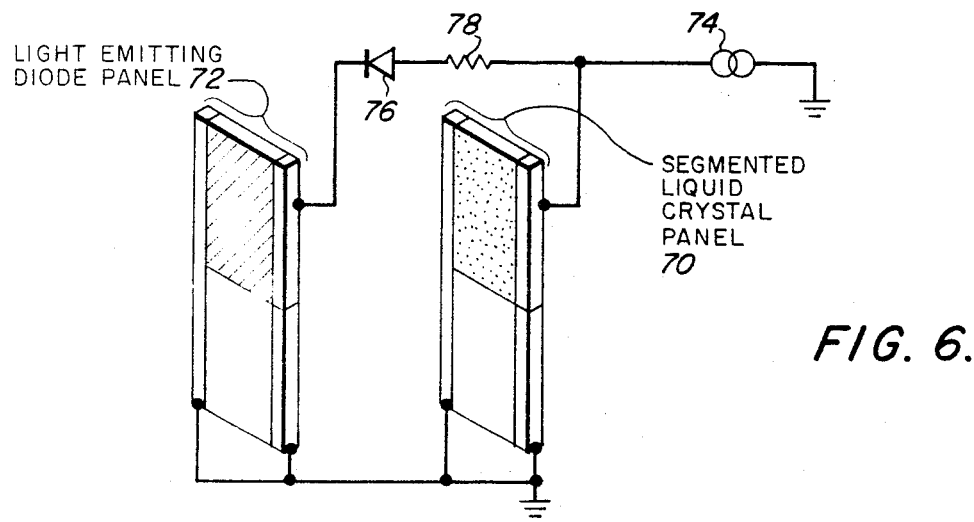
FIG. 6 illustrates schematically a suitable arrangement for activating coincident locations of a liquid crystal panel and a segmented light emitting diode source of back-lighting for a combination display as described herein.

FIG. 6 illustrates schematically a suitable electronic driving circuit and device configuration for a display formed from a segmented liquid crystal panel and backlit with a segmented light-emitting diode array. A segmented liquid crystal panel 70 is shown as being activated in its upper portion and non-activated in its lower portion. A segmented light-emitting diode array panel 72 is also shown having an activated upper portion coincident with that of the liquid crystal panel 70. A voltage source 74 provides a voltage to drive the display which may be, for example, 25 volts at 30 Hz. Since light emitting diodes operate at a significantly lower voltage, typically 5 volts, and can be damaged by operation at other than uinpolar voltages, a diode 76 and a current limiting resistor 78 are placed in series with the light-emitting diode array 72.

Figure 7:
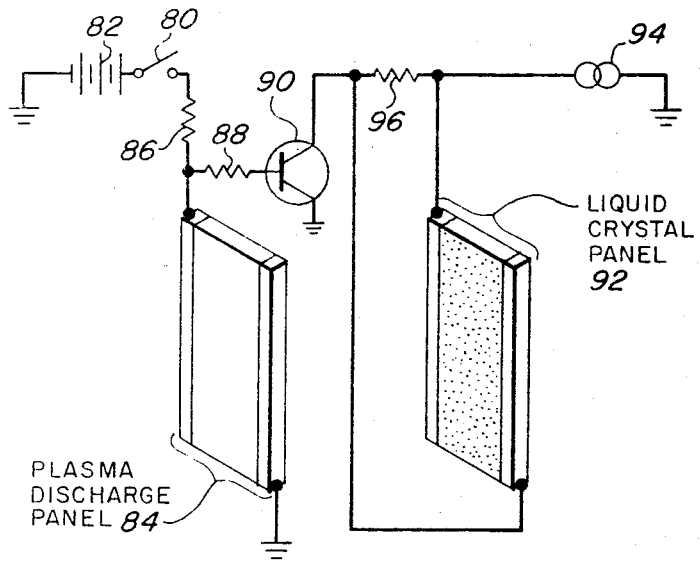
FIG. 7 illustrates schematically a suitable arrangement for activating coincident locations of a liquid crystal panel and a segmented plasma discharge lamp source of back-lighting for a combination display as described herein.

FIG. 7 illustrates schematically a device configuration and driving circuit which provides the required dc potential for segmented back-lighting sources such as gas discharge panels, vacuum fluorescent panels, plasma panels, etc. In general, this dc driving potential is relatively high, typically 170 volts. For purposes of simplifying this illustration, only a single active element of both a liquid crystal panel and a gas discharge panel are shown.

When switch 80 is closed, the full voltage from dc voltage source 82 is applied across plasma discharge panel 84 causing it to conduct and emit light. Resistor 86 limits the current flow through the plasma panel 84 to maintain a safe operating level. Resistor 88 is a dropping resistor which limits the voltage applied to transistor 90 to a safe switching level.

Liquid crystal panel 92 is activated by ac voltage source 94, typically supplying about 25 volts at 30 to 100 Hz. Resistor 96 is chosen so that when transistor 90 is in the off state, the voltage across liquid crystal panel 92 is essentially zero. However, when an activating voltage is applied to transistor 90 by closing switch 80, the transistor becomes conducting and the full voltage from source 94 appears across liquid crystal panel 92 which is connected in parallel with resistor 96. Thus, the liquid crystal element and the corresponding back-lighting element are simultaneously activated.

Liquid crystal materials have been found in three different mesomorphic forms: the nematic, smectic and cholesteric forms. It is believed that Liquid crystal materials from each of these classes can be made to operate in the invention described herein. Nematic liquid crystal materials are preferred since these usually require much lower voltages and have faster response times than other types. Moreover, those nematic liquid crystal materials which exhibit dynamic scattering of light under an applied voltage are particularly preferred. Typically, nematic dynamic scattering liquid crystal materials exhibit negative dielectric anisotropy and conductivities in the range of about $10^{-11}$ ohm-cm. to $10^{-8}$ ohm-cm. These conductivities are sometimes obtained by doping (See Haller et al., U.S. Pat. No. 3,656,834). Although nematic dynamic scattering liquid crystals are particularly preferred, it is believed that field effect or DAP effect liquid crystals could also be used if appropriate polarizing optics, etc. were used.

Liquid crystals, including nematic dynamic scattering liquid crystal materials, have been described in detail in the literature. Their preparation and fabrication into panels is also described. See, for example, British Pat. No. 1,170,486 in the names of Goldmacher and Castellano and U.S. Pat. No. 3,697,150, in the name of Wysocki; the teachings of these patents are incorporated by reference. Some specific suitable examples of nematic dynamic scattering liquid crystals are as follows: p-methoxybenzylidene-p-n-butylanaline; p-ethoxybenzylidene-p-n-butylanaline; p-butoxybenzylidene-p-n-butylanaline; p-aminophenyl acetate; trans-4-butyl-$\alpha$-chloro-4'-ethoxystilbene; trans-4-octyl-$\alpha$-chloro-4-'-ethoxystilbene; Licristal phase 5 (EM Laboratories); and, Licristal phase 7a (EM Laboratories). Mixtures of any liquid crystal materials can be used, of course.

Reference is made to copending applications, U.S. Ser. Nos. 375,977, 375,979, and 375,978, all of which were filed on July 2, 1973 are incorporated by reference.

What is claimed is:

1. A display which is illuminated by an external source of front lighting, comprising:
   a. a layer of liquid crystal material which exhibits dynamic scattering upon application of an electric field thereacross, said layer being positioned between a front transparent electrode and a back transparent electrode;
   b. means to selectively apply an electric field across discrete areas of said layer of liquid crystal material;
   c. a source of back-lighting;
   d. means to selectively activate predetermined areas of said source of back-lighting, said predetermined areas coinciding with discrete areas of said liquid crystal materials which are activatable; and,
   e. a dichroic reflecting layer positioned between said liquid crystal material and said source of back-lighting, said dichroic reflecting layer being one which transmits wave lengths emitted by said source of back-lighting and which reflects other wave lengths.

2. A display of claim 1 wherein said liquid crystal panel contains a nematic liquid crystal material.

3. A display of claim 2 wherein said means to selectively activate discrete areas of said liquid crystal panel comprise means to selectively apply an electric potential across discrete locations of said liquid crystal material.

4. A display of claim 3 wherein said means to selectively activate include a voltage source electrically connected to said transparent electrodes on each side of said liquid crystal material.

5. A display of claim 4 wherein said one of said electrodes is segmented.

6. A display of claim 5 wherein said means to selectively activate predetermined areas of said source of back-lighting comprise a voltage source electrically connected to electrodes placed on opposite sides of said source of backlighting, at least one of said electrodes being segmented coincidentally with the segmented electrode positioned next to the liquid crystal material.

7. A display of claim 6 wherein said source of back-lighting comprises a segmented electroluminescent panel.

8. A display of claim 6 wherein said source of backlighting comprises a segmented incandescent source.

9. A display of claim 6 wherein said source of backlighting comprises a segmented light-emitting diode array panel.

10. A display of claim 6 wherein said source of backlighting comprises a segmented plasma discharge panel.

11. A display of claim 6 wherein said dichroic reflecting layer transmits green light and reflects red and blue light.

12. A display of claim 6 wherein said dichroic reflecting layer includes a transparent conducting layer.

* * * * *